US008799033B2

(12) United States Patent
Kravitz et al.

(10) Patent No.: US 8,799,033 B2
(45) Date of Patent: *Aug. 5, 2014

(54) METHODS AND SYSTEMS FOR PROVIDING LONGEVITY INSURANCE WITH OR WITHOUT AN ASSET BASED PREMIUM

(75) Inventors: Jodi L. Kravitz, New York, NY (US);
John R. Meyer, Staten Island, NY (US);
Michael J. Gordon, New York, NY (US)

(73) Assignee: New York Life Insurance Company, New York, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/536,205

(22) Filed: Jun. 28, 2012

(65) Prior Publication Data
US 2012/0271662 A1 Oct. 25, 2012

Related U.S. Application Data

(63) Continuation of application No. 11/744,522, filed on May 4, 2007, now Pat. No. 8,234,132, and a continuation-in-part of application No. 10/960,631, filed on Oct. 7, 2004.

(51) Int. Cl.
*G06Q 40/00* (2012.01)

(52) U.S. Cl.
CPC ..................... *G06Q 40/00* (2013.01)
USPC ................................. 705/4; 705/35

(58) Field of Classification Search
CPC ...... G06Q 10/10; G06Q 40/06; G06Q 50/163
USPC ..................... 705/4, 314, 36 R, 35
See application file for complete search history.

(56) References Cited

PUBLICATIONS

Pechter, Kerry. "Longevity Insurance in a VA Wrapper: New York Life's New Annuity Sweetens a Bitter Pill. (variable annuity)". Annuity Market News. Feb. 1, 2007 (3 pages).*

* cited by examiner

*Primary Examiner* — Elda Milef
(74) *Attorney, Agent, or Firm* — Meister Seelig & Fein LLP

(57) ABSTRACT

The present invention provides methods and systems for providing longevity insurance by obtaining information useful for issuing a longevity insurance contract for an individual, and determining a premium or an income payment for the individual that are computed based at least in part on an individual's age at a predetermined date that income payments are deferred to. The longevity insurance contract generally provides deferred income payments for a period of time, such as for the life of the individual, beginning at a predetermined date that is after an individual's anticipated retirement, or at a predetermined date that is after the individual's life expectancy, or on or after a specified birthday of the individual.

17 Claims, 15 Drawing Sheets

Welcome

Retirement Income Insurance | My Home | Tips & Help | Contact

Profile | Retirement Income Needs | Assets | Results

Your Clients Personal Information

About your Client

Your Clients Personal Information *required

- First Name: John *
- Last Name: Customer *
- Gender: – Select – *
- Date of Birth: 07 / 11 / 1974 *
- Current Age: 30 *
- Address:

Retirement Information

- Already in retirement?
- Expected Retirement Age: 65
- Household Information
- Marital Status: – Select –

About your Clients Spouse

Your Client Spouse's Information

- First Name:
- Last Name:
- Gender: – Select –
- Date of Birth: 07 / 11 / 1974
- Current Age: 30
- Retirement Age: 65

[Next]

FIG. 4

Welcome

Profile | Retirement Income Needs | Assets | Results

Retirement Income Needs

Your Monthly Expenses

Basic expenses including those most critical to daily living. When considering basic expenses clients are advised to be conservative. Healthcare costs are considered separately from other expenses because they often comprise a significant percentage of monthly expenses and increase at a faster rate.

Healthcare Expenses $ [1200]
Estimated Annual Inflation Rate [6] %
Other Basic Expenses $ [800]
Estimated Annual Inflation Rate [2] %

Discretionary: When considering your clients expenses consider the cost of your clients leisure time activities Discretionary Expenses $ [1000]
Estimated Annual Inflation Rate [2] %

[Calculate Expenses]   Total $3,000

Monthly Healthcare Expense Worksheet

Health Insurance Premium: $ [200]
Health Insurance Deductible: $ [ ]
Doctor Visits: $ [200]
Prescription Drugs: $ [200]
Hospital Stays: $ [200]
Other Medical: $ [200]
Dental: $ [200]

[Calculate]   Total $1,200

[Next]

[NEW YORK LIFE]

Retirement Income Insurance     My Home | Tips & Help | Contact

Welcome

| Profile | Retirement Income Needs | Assets | Results |

Assets

Your Clients Household Assets
Current Assets in Accumulation Vehicles.
Accumulated assets include funds in financial accounts, including savings, brokerage and mutual fund accounts.

Non-Qualified / Taxable Accounts $ ____
Qualified / Accounts $ ____
Tax Free Accounts $ ____
Tax Deferred Accounts $ ____

[Calculate Total Balance] Total $ ____

Guaranteed Lifetime Income
Guaranteed Lifetime Income should include only from social security, pension plans and annuities.

Guaranteed Lifetime Income $ ____
Other Reoccurring Income sources examples include property income and dividends
Other Reoccurring Income $ ____

Taxes
Tax Rates below are predetermined based upon the state in which your client lives.

Federal Tax: 28 %
State Tax: 4 %
Local Tax: 2 %
Capitol Gains Tax: 20 %

Guaranteed Lifetime Income Worksheet

Lifetime Retirement Income Summary
Monthly Payment Account: $ ____
Taxable Portion:% ____
Annual Increase:% ____
Age of Expiration: 100
[SAVE]

Guaranteed Lifetime Income Worksheet Details

Provide details below and click to Populate Summary

☐ Pension/Defined Benefit Plan
☐ Social Security Benefits
☐ Lifetime Income Annuity Benefits

[Next]

FIG. 7

Retirement Assets Over Time in Retirement - Tabular Format

Retirement Assets Over Time

| Age | Accumulated Assets ($) | Healthcare Expenses ($) | Other Basic Expenses ($) | Discretionary Expenses ($) | SPIA Premiums ($) | Longevity Insurance Premiums ($) | Total Expenses ($) | Guaranteed Income ($) | Other Income ($) | SPIA Income ($) | Longevity Insurance Income ($) | Personal Pension Income ($) | Total Income ($) |
|---|---|---|---|---|---|---|---|---|---|---|---|---|---|
| 65 | 1,436,450 | 75,020 | 6,521 | 17,389 | 0 | 0 | 105,720 | 19,008 | 12,572 | 0 | 0 | 0 | 31,600 |
| 66 | 1,659,051 | 86,720 | 6,651 | 17,737 | 0 | 0 | 111,107 | 19,368 | 12,925 | 0 | 0 | 0 | 32,313 |
| 67 | 1,716,232 | 91,022 | 6,784 | 18,092 | 0 | 0 | 116,798 | 19,775 | 13,189 | 0 | 0 | 0 | 32,960 |
| 68 | 1,445,571 | 97,437 | 6,920 | 18,453 | 0 | 0 | 122,810 | 20,171 | 13,448 | 0 | 0 | 0 | 33,619 |
| 69 | 1,360,440 | 102,284 | 7,058 | 18,822 | 0 | 0 | 129,164 | 20,575 | 13,717 | 0 | 0 | 0 | 34,292 |
| 70 | 1,409,474 | 109,481 | 7,200 | 19,100 | 0 | 0 | 135,880 | 20,986 | 13,991 | 0 | 0 | 0 | 34,977 |
| 71 | 1,521,102 | 116,049 | 7,344 | 19,583 | 0 | 0 | 142,976 | 21,406 | 14,271 | 0 | 0 | 0 | 35,677 |
| 72 | 1,141,962 | 123,012 | 7,490 | 19,975 | 0 | 0 | 150,177 | 21,834 | 14,556 | 0 | 0 | 0 | 36,390 |
| 73 | 675,877 | 130,393 | 7,540 | 20,374 | 0 | 0 | 158,487 | 20,271 | 14,974 | 0 | 0 | 0 | 37,110 |
| 74 | 744,589 | 133,317 | 7,793 | 20,782 | 0 | 0 | 166,792 | 22,716 | 15,144 | 0 | 0 | 0 | 37,860 |
| 75 | 780,959 | 146,510 | 7,945 | 21,197 | 0 | 0 | 175,656 | 23,171 | 15,447 | 0 | 0 | 0 | 38,618 |
| 76 | 477,822 | 155,900 | 8,100 | 21,521 | 0 | 0 | 185,029 | 23,534 | 15,756 | 0 | 0 | 0 | 39,390 |
| 77 | 295,104 | 164,610 | 8,270 | 22,054 | 0 | 0 | 194,942 | 24,107 | 16,071 | 0 | 0 | 0 | 40,178 |
| 78 | 123,542 | 174,495 | 8,435 | 22,495 | 0 | 0 | 205,425 | 24,589 | 16,399 | 0 | 0 | 0 | 40,982 |
| 79 | --- | 184,965 | 8,504 | 22,945 | 0 | 0 | 216,514 | 25,081 | 16,720 | 0 | 0 | 0 | 41,801 |
| 80 | --- | 196,038 | 8,776 | 23,403 | 0 | 0 | 228,242 | 25,582 | 17,055 | 0 | 0 | 0 | 42,637 |
| 81 | --- | 207,827 | 8,852 | 23,971 | 0 | 0 | 240,650 | 26,094 | 17,396 | 0 | 0 | 0 | 43,490 |
| 82 | --- | 220,297 | 9,131 | 24,349 | 0 | 0 | 253,777 | 26,616 | 17,744 | 0 | 0 | 0 | 44,360 |
| 83 | --- | 233,514 | 9,313 | 24,396 | 0 | 0 | 267,663 | 27,148 | 18,099 | 0 | 0 | 0 | 45,247 |
| 84 | --- | 247,525 | 9,500 | 25,333 | 0 | 0 | 282,358 | 27,691 | 18,461 | 0 | 0 | 0 | 46,152 |
| 85 | --- | 262,377 | 9,690 | 25,889 | 0 | 0 | 297,906 | 28,245 | 18,990 | 0 | 0 | 0 | 47,075 |
| 86 | --- | 278,119 | 9,884 | 26,356 | 0 | 0 | 314,359 | 28,810 | 19,207 | 0 | 0 | 0 | 48,017 |
| 87 | --- | 294,806 | 10,081 | 26,383 | 0 | 0 | 331,770 | 29,386 | 19,591 | 0 | 0 | 0 | 48,977 |
| 88 | --- | 312,495 | 10,263 | 27,421 | 0 | 0 | 350,199 | 29,974 | 19,982 | 0 | 0 | 0 | 49,956 |
| 89 | --- | 331,245 | 10,460 | 27,969 | 0 | 0 | 369,702 | 30,573 | 20,082 | 0 | 0 | 0 | 50,955 |

FIG. 13

METHODS AND SYSTEMS FOR PROVIDING LONGEVITY INSURANCE WITH OR WITHOUT AN ASSET BASED PREMIUM

CLAIM OF PRIORITY

The present application is a continuation of and claims priority to U.S. patent application Ser. No. 11/744,522, filed on May 4, 2007, which is a Continuation-In-Part Application of U.S. patent application Ser. No. 10/960,631, filed on Oct. 7, 2004. The disclosures which are hereby incorporated by reference herein in their entirety.

BACKGROUND OF THE INVENTION

This invention relates generally to retirement planning. More particularly, the present invention relates to methods and systems for managing assets and asset allocations to fund retirement.

Individuals often prepare for retirement by first determining a desired retirement income and then preparing a plan to achieve the desired retirement income, which generally can be anywhere between 40%-80% of the pre-retirement income, or more, based on the individual's retirement goals and concessions, e.g., travel, new car purchases, etc., for the life of the individual. Financial planning for retirement is generally separated into two time periods: pre- and post-retirement. During the pre-retirement phase, the individual's goal is to accumulate sufficient assets, such as savings, investments, etc., to achieve the desired retirement income. The post-retirement goals are to manage the accumulated assets in order to generate a desired level of income and to sustain an adequate level of income for the life of the individual, which now can exceed 30 years beyond the individual's retirement date.

Retirement financial planning is, consequently, uncertain insofar as it is contingent in part upon the life of the individual, and the two elements of the post-retirement goal work against each other. For individuals who are not in a position to leave behind a sizable estate, the uncertainty over how long the individual will live invariably negatively impacts many individuals that are determined, in retrospect, to have been either over protected for retirement, e.g., they do not exceed their life expectancy, or under protected for retirement, e.g., by exceeding their life expectancy. Over-protected individuals generally spend less and/or save more than they may otherwise have desired, either in the pre- or post-retirement time periods, or both. The impact on under-protected individuals may be more serious insofar as they may be forced to live with relatively little income, e.g., Social Security alone, during many of their years after retirement.

The assets accumulated for retirement may include cash, securities, deferred annuities, such as fixed or variable annuities, real and personal property, etc., which are generally drawn upon for retirement income. These types of assets, however, provide the finite source of income that either gets under withdrawn or underutilized by the over-protected individuals or that gets depleted by the under-protected individuals as explained above. Many individuals have addressed uncertainty in this respect by using some of their retirement assets once they reach retirement to purchase immediate annuities (annuitization) that provide guaranteed income for life that begins immediately. This product addresses both retirement goals by providing a reliable source of income throughout retirement and by guaranteeing the income will continue as long as the client lives, no matter how long that may be. The amount of income paid from the immediate annuity is generally based on the size of the investment, e.g., the purchase price, the individual's age at the time of the purchase, gender, interest rates, etc. For example, at the present time, a male individual that invests $100,000 in an immediate annuity at the age of 65 with a life expectancy of about 15 years can typically expect a yearly income of about $8,000-9,000 depending on the interest rate.

Although immediate annuities prove to be a good value for those who exceed their life expectancy, it can be, in retrospect, a lesser value for those who do not live beyond their life expectancy. Moreover, because immediate annuity payments begin immediately, a sizable investment is required in order to derive a modest yearly income. Many individuals who might otherwise benefit from the risk-reducing benefits of immediate annuities find these aspects of immediate annuities unappealing and therefore avoid immediate annuities altogether. Moreover, many of these people also do not adequately manage their assets and withdrawals to account for longevity, e.g., the very real possibility of exceeding their life expectancy. Accordingly, there is a need for investments for use in funding retirement that better deal with the uncertainty associated with longevity, and for methods to illustrate and protect against longevity risk (one element of the post-retirement goal) that is split off from a "whole retirement" income source (the other element of the post-retirement goal).

In addition, some individuals who desire a product that addresses both elements of the post-retirement goal, such as an immediate annuity, may want to pre-fund such an income source in order to take advantage of the time prior to retirement, when such an income source can be built up through tax deferred savings, and to take advantage of mortality credits that may accrue to pooling such savings and making them available only to those in the pool who reach retirement age, much in the way that corporate defined benefit pensions have traditionally enabled individuals to build up a retirement income during their working years. As such plans, which were generally funded by employers as a benefit, are much less prevalent than they were in the past, people may desire to create their own "personal pension."

SUMMARY OF THE INVENTION

The present invention provides methods and systems for providing, illustrating and administering longevity insurance. In one aspect of the invention, a method for providing longevity insurance is provided by obtaining information useful for issuing a longevity insurance contract for an individual, and determining a premium or an income payment for the individual that is computed based at least in part on an individual's age at a predetermined date to which income payments are deferred. The longevity insurance contract generally provides deferred income payments for a period of time, such as for the life of the individual, beginning at a predetermined date that is after an anticipated retirement date for the individual. In general, the income payments commence at or near a date which is determined to maximize the retirement assets of the individual which may vary depending on the individual's overall asset portfolio, including available assets based on pooling arrangements. In some embodiments, the income payments commence at or near the individual's life expectancy, or a pre-determined number of years after the anticipated retirement, such as 5 or 10 years after, or at a date which is sufficiently after the anticipated retirement date to effect a reduced premium for the longevity insurance contract.

In one embodiment, a personal pension provides deferred income payments for a period of time, such as for the life of the individual, and is funded pre-retirement and generally begins providing income payments to the individual at retirement. Such a product differs from longevity insurance insomuch as it provides an income throughout retirement, much like an immediate annuity does; however, it is similar to longevity insurance in that it is pre-funded by the individual and it takes advantage of the mortality credits that accrue to individuals who reach the date at which the income payments begin that derive from pooling the individual risks.

In one embodiment, the premium or income payment is computed based at least in part on a probability of the individual outliving the predetermined date to which the income payments are deferred, such as a predetermined date that is based at least in part on an individual's life expectancy or a date, for example, on or after an individual's seventy fifth birthday. The longevity insurance contract may be limited to individuals who are less than or equal to seventy-five years of age when the contract issues. In one embodiment, premium payments are made on either a flexible or scheduled basis for a duration that ends no later than the predetermined date to which the income payments are deferred, such as when the individual retires. In another embodiment, a single premium payment is the only payment made before the predetermined date to which the income payments are deferred, such as when the individual retires. A cost of living increase may also be applied to the income payments.

In one embodiment, the longevity insurance contract is provided without a surrender value, a death benefit, a reduced paid-up annuity in the event of a lapse in scheduled or periodic premium payments, or a combination thereof. In another embodiment, the longevity insurance contract is provided with a reduced surrender value, death benefit, a reduced paid-up annuity in the event of a lapse in scheduled or periodic premium payments or a combination thereof. In another embodiment, a mortality basis is used to compute the premium or income payments, which is guaranteed for the life of the contract. In yet another embodiment, the longevity insurance provides guaranteed payments for a period certain (e.g., 5 years, 10 years, or years), either with or without an accompanying lifetime guaranty. In another embodiment, the longevity insurance contract is issued with a guaranteed minimum crediting rate. In still another embodiment, the longevity insurance is included within a deferred fixed or variable annuity as an additional feature, which may be funded within the deferred fixed or variable annuity policy.

In certain embodiments, the longevity insurance contract provides fixed income benefits known at the time of purchase or income benefits based at least partly on the performance of investment options offered within the contract during the deferral period. In one embodiment, the longevity insurance contract provides a fixed income benefit based on the pricing in effect at the time of each premium payment. In another embodiment, the longevity insurance contract provides an income benefit based on the pricing in effect at the time of purchase as well as the performance of investment options offered within the contract during the deferral period. In some instances, the percentage of each premium (e.g., 0% to 100%) allocated to the variable product component is contractually determined. Alternatively, a party to the contract (e.g., the policy owner) sets the percentage of each premium (e.g., 0% to 100%) allocated to the variable product component, with the balance going to the fixed product component. Such an approach enables a party (e.g., the policy owner) to modulate market exposure during the deferral period. In some instances, the contract offers a guaranteed minimum income benefit during the payout phase using any number of approaches (e.g., the income generated by the premium(s) allocated to the fixed product component, or a pre-determined percentage of cumulative premiums paid).

In another aspect of the invention, a method for administering longevity insurance is provided by receiving a claim for deferred income payments from an individual in accordance with a longevity insurance contract, determining whether the longevity insurance contract has matured, and distributing the deferred income payments if the longevity insurance contract has matured. In this instance, the income payments were computed based at least in part on the probability that the insurance contract would mature, such as when the individual outlives a predetermined date.

In some embodiments, the predetermined date is based at least in part on an individual's life expectancy and the income payment is computed based at least in part on a probability of the individual outliving his or her life expectancy. In one embodiment, the predetermined date is, for example, later than an individual's seventy-fifth or eightieth birthday and the income payment is computed based at least in part on the probability of the individual outliving the predetermined date. In another embodiment, the longevity insurance contract is limited to individuals who are less than or equal to seventy-five years of age when the contract issues.

In one embodiment of the present invention, a retirement planning tool is provided to perform methods of retirement asset and income allocation assessments, demonstrations and recommendations. In some embodiments, an overview of an individual's investment portfolio is created reflecting retirement income and investment assets, risk demonstrations and mitigation scenarios are demonstrated, and recommendations are provided concerning an individual's assets incorporating some degree of guaranteed lifetime income.

BRIEF DESCRIPTION OF THE DRAWINGS

Certain embodiments of the invention are illustrated in the figures of the accompanying drawings which are meant to be exemplary and not limiting, in which like references are intended to refer to like or corresponding parts, and in which:

FIGS. 4-13 depict graphical user interfaces for use in providing longevity insurance according to at least one embodiment of the invention.

DETAILED DESCRIPTION OF THE PREFERRED EMBODIMENTS

The present invention generally provides methods and systems for providing longevity insurance, providing retirement income, and/or enhancing retirement funding with longevity insurance. The term longevity insurance is used herein to generally denote a product, whether contractual or otherwise, that is designed to address the inherent uncertainty associated with longevity, e.g., whether or not an individual will outlive his or her life expectancy and/or how long the individual will live, that makes retirement planning difficult. Life expectancy may be based on mortality data or otherwise selected for the purpose of computing longevity insurance variables, such as a premium or income payments derived therefrom, as discussed herein. Longevity insurance, therefore, includes, but is not limited to, insurance contracts, annuities, securities, investments, etc., or a combination thereof, that generally provide a source of income for at least a portion of retirement, e.g., a tail end of retirement beginning at a predetermined date, such as a date at or near the individual's life expectancy.

Figure 1:
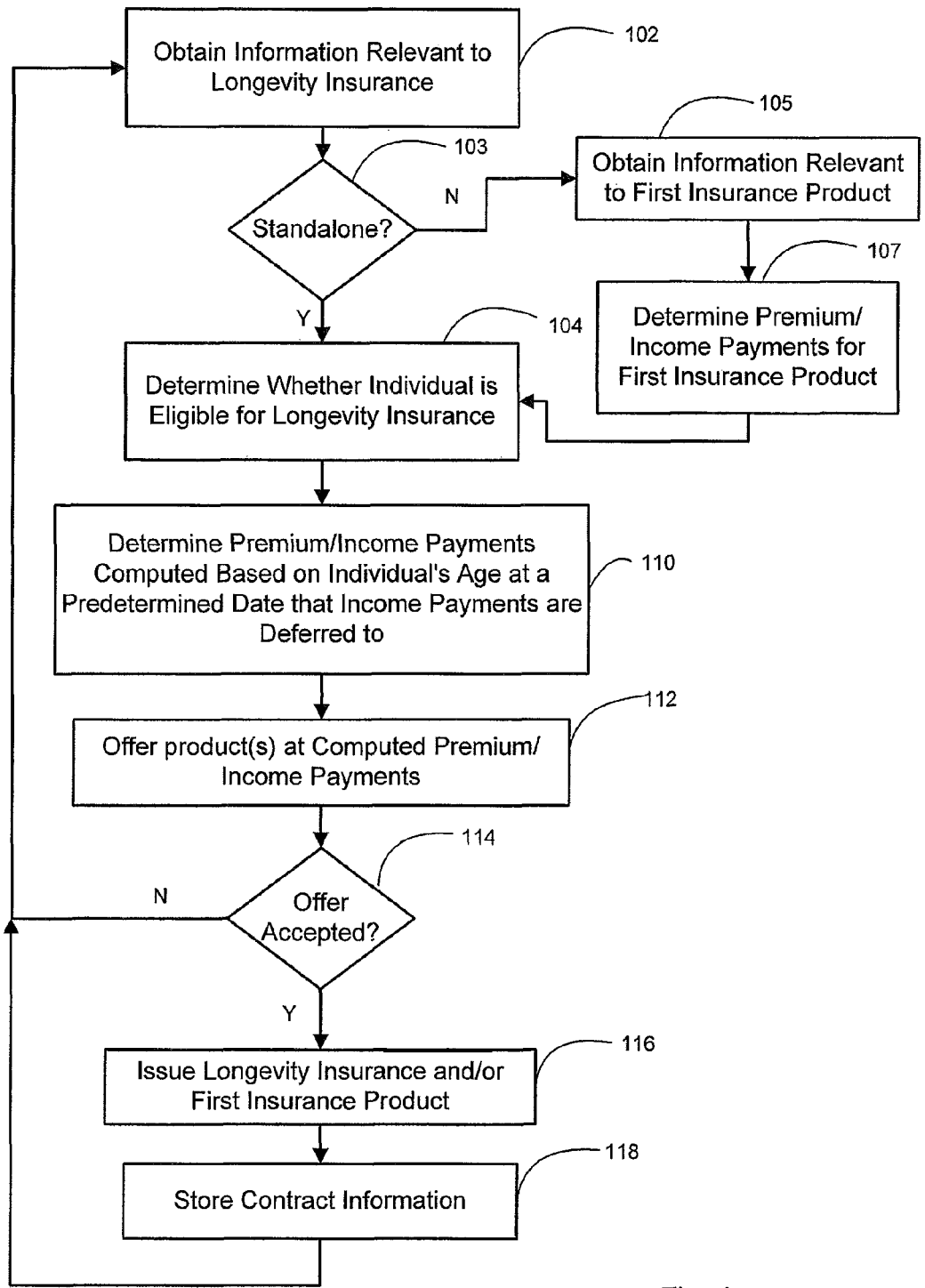
FIG. 1 is a flowchart of a method of providing longevity insurance according to one embodiment of this invention.

Referring to FIG. 1, a method for providing longevity insurance according to one embodiment of this invention begins at step 102 with obtaining information, which is useful for issuing or otherwise computing a premium or income payments in accordance with the longevity insurance contract. The information may be obtained with the graphical user interface screen shown in FIG. 4, which is described in greater detail below. Insurance contracts may be purchased in various ways and in various forms. For instance, a purchaser may specify a desired premium that the purchaser is willing to pay and income payments that begin on a predetermined date may then be computed or otherwise determined based on the desired premium. The term premium is used herein to denote the purchase price of an insurance contract, which may be paid in one lump sum, a series of ad hoc payments, or a series of periodic payments, such as monthly, semiannually, yearly, etc., whether as a direct charge or otherwise charges as a fee or deduction against an account's assets or otherwise. Alternatively, the purchaser may specify desired income payments to begin on the predetermined date and one or more premiums may be computed or determined based on the desired income payments. The desired income payments may be obtained with the graphical user interface screen shown in FIG. 5, which is explained in greater detail below. The desired income payments may also take into account the assets the individual has or expects to have at the future date. The assets may be specified with the interface screen shown in FIGS. 6-7. Accordingly, certain items of information, such as the premium or the amount of the income payments may be factored into or used as a basis for computing or determining the premium or income payments, as the case may be, and may therefore be necessary items of information.

The type of information that is useful for issuing the longevity insurance contract, whether for computational purposes or otherwise, may vary, and may include personal information regarding the individual or individuals, information regarding variables or options associated with longevity insurance, etc. Some or all of the information may also be useful for issuing a first insurance product, such as an annuity or any other type of investment, in combination with longevity insurance as discussed below. Personal information generally identifies the insured and may include the name, date of birth, age, address, and gender of the insured or of the insureds, etc. Variables associated with longevity insurance may include a desired income payment and the duration of the income payments, which is usually for the life of the insured or a desired premium. Additional variables may concern premium payment options, such as whether there will be a single premium payment, one or more ad hoc premium payments or periodic premium payments (annually, monthly, etc.) and the extent to which periodic premium payments vary in amount, the duration that premium payments are to be made, e.g., up to an anticipated retirement age, such as age 65, whether or not the premium payment period lasts for the entire deferral period, or, in the event that premiums are to be deducted from the assets of a first insurance product, when the first insurance product ceases to be in effect. Still further variables may include whether the insurance will be purchased as a standalone or in combination with another product, the predetermined date that income payments are to begin or be deferred, i.e., the date the contract matures, such as at the date the individual reaches 75, 80, 85, 90, 95, etc, years of age, or generally any age that is 75 or over, the probability that the individual will reach or outlive the predetermined maturity date, the selection of an option to advance or defer the maturity date, or whether or not annual cost of living increases, e.g., of 3% or 5%, or any other type of cost of living increase, should be applied to the income payments. Other variables may include mortality variables, such as gender, the individual's age at the time the contract issues, i.e., the issue age, the individual's life expectancy, etc. Variables concerning the selection of riders or other options may also be included, such as a long term care rider, an annual increase option to provide annual increases as a hedge against inflation, a changing needs option to allow a policy owner to schedule, at the time of purchase, future increases or decreases in the income payment amounts, or an income enhancement option to allow a consumer concerned about "locking in" lifetime income in a low interest rate environment to enjoy an automatic increase in benefits if a benchmark index is at least a certain number of percentage points (e.g., two) higher at a particular future time (e.g., the fifth policy anniversary). Any one or more of the variables discussed here may be used in combination with other variables discussed here or otherwise.

As noted above, longevity insurance may be provided as a stand-alone product or in combination with other products, e.g., as a provision of first insurance product, such as in the form of a feature of the first insurance product, such as to a fixed or variable annuity, deferred or otherwise, or in the form of a rider to the first insurance product, where the features of the combined product in some cases serve to fund different periods or stages of retirement, e.g., to fund a period of time that includes time before the predetermined maturity date and a period of time after the predetermined date. For example, a variable or fixed annuity, which can be either left to accumulate or drawn upon as needed to provide income before the predetermined maturity date, may be combined with longevity insurance, as described herein, which provides income for life or for some other term that begins on or about the predetermined maturity date of the contract. Regardless of whether the variable or fixed annuity is left to accumulate or drawn upon for income, the individual may beneficially derive a larger income stream, up to the maturity date of the contract, from the individual's accumulated assets (whether those assets are inside the first insurance product or are other assets outside of the first insurance product) than might otherwise be derived with an immediate annuity for a comparable premium. Thus, if at step 103 longevity insurance is being purchased in combination with a first insurance product, information relevant to issuing the first insurance product, such as the type of the first insurance product, e.g., a fixed or variable annuity, a maturity date under the first insurance product, the desired income or premium for the first insurance product, the duration of income payments for the first insurance product, etc., may be obtained at step 105 and the pricing of the first insurance product, e.g., the computed premium based on the desired payout or the computed payout based on the desired premium, may be determined at step 107.

In some embodiments, the longevity insurance of the present invention, whether as a stand alone product or as a provision of a first insurance product, may be provided at a premium or cost that is lower than that for than an immediate annuity providing comparable income payments. The reduced premium may be achieved in a variety of ways. In one embodiment, the premium is reduced by deferring income payments to a maturity date that is substantially after the individual's anticipated retirement date. In some embodiments, this will be a date that is near or about the individual's life expectancy. Alternatively, the income payments may be deferred until a target maturity date or for a minimum waiting period that similarly defers income payments such as 5 or 10 years after the anticipated retirement date. In some embodiments the length of time after the anticipated retirement date for the longevity insurance contract income payments to begin will be a period of time that creates a situation where the risk of uncertainty, e.g., that an individual will outlive the predetermined date to which income payments are deferred, is distributed among a group of insured individuals or annuitants, such that the income payments for individuals that outlive the maturity date of their contract are funded at least in part by the premiums paid by those individuals that do not outlive the maturity date of their contract. Premiums are reduced in this respect since the risk or the probability of outliving a maturity date diminishes the longer income payments are deferred for the individual. The maturity date may be any time after the individual's anticipated retirement, sufficiently after the anticipated retirement, e.g., when the individual reaches an advanced age, such as at the date the individual reaches age 75, 80, 85, 90, 95, etc., or at about the individual's life expectancy or some time thereafter. Similarly, the maturity date may reflect a minimum waiting period that is, e.g., 10, 15, 20, 25, 30, etc. years after issuance of the contract or the individual's anticipated retirement.

The premium may also be reduced with longevity insurance that is provided without a death benefit, a surrender value, a reduced paid-up annuity in the event of a lapse in scheduled or periodic premium payments, or a combination thereof, or with a longer premium payment period. Alternatively, the longevity insurance may be offered with a death benefit, a surrender value, a reduced paid-up annuity in the event of a lapse in scheduled or periodic premium payments, or a combination thereof. To accomplish a reduced premium with the longer premium payment period, the longevity insurance contract may be limited to individuals having a maximum issue age, e.g., 75 years of age. Similarly, the maximum issue age may be limited to an age that is, e.g., 5, 10, 15, 20, or 25 years, less than a premium paid up date or age. For example, the maximum issue age may be set at about 50 years of age in instances where the individual elects to be paid up by the individual's income start date. This way, if the date, for example, is the individual's retirement date, then the individual has as much as 15 years to pay the premium, assuming the individual elects to be paid up by age 65. Although the longevity insurance is discussed herein as being based on the life of a single individual, it is understood that longevity insurance is equally applicable for a joint life payout and to lifetime payouts with payment guarantees.

In some embodiments, the longevity insurance product is offered for sale as an individual policy and in other embodiments in a group structure or worksite environment. In an embodiment utilizing a group structure or worksite environment, the cost is paid either by the individual via automatic paycheck deductions, either pre- or post-tax, from the employee's paycheck or it is paid by the employer. In some embodiments, whether individual or group structured, the premium(s) are paid with a single payment or with multiple scheduled or unscheduled payments, or as asset-based charges deducted from a pool of assets, such as the accumulation value inside a variable annuity. In some cases, income benefits associated with premiums paid are aggregated to provide a single periodic benefit and in others are paid so that periodic benefits are associated with specific premium payments.

Some or all of the variables associated with longevity insurance may be specified by the insurer and may not therefore be subject to negotiation or change. For example, the insurer may limit the minimum maturity age or the predetermined date on which income payments are to begin, such as to a date on or near the individual's life expectancy, and/or may limit eligibility to a predefined group of individuals, such as individual's having an age at issue of 75 or less, etc. Similarly, the insurer may set the predetermined date to reflect a minimum waiting period that defers income payments for a period of time so set. Accordingly, in this instance, a determination is made at step 104 whether the individual is an acceptable insured based on eligibility requirements for the longevity insurance contract. An insurer is used herein to denote the party offering and/or guaranteeing the longevity insurance contract. The insurer may therefore be an insurance company, a guarantor, an employer, a private party, agents thereof, etc. In one embodiment, the longevity insurance contract is made available to individuals that are, for example 75 years old or less. In another embodiment, the longevity insurance contract is made available to individuals at a minimum issue age that would allow for at least 10 years of premium payments between the individual's issue age and the premium paid up date or age. In this instance, a determination is made at step 104 whether or not the individual satisfies the age requirements for the contract.

At least one contract variable, such as a premium, income payment, or any one of the other variables noted above, for the longevity insurance contract may then be determined or computed at step 110. In accordance with one embodiment of the present invention, the premium or income payment is computed based at least in part on the individual's age at the selected maturity date of the contract or, more generally, the predetermined date to which income payments are deferred. As noted above, the maturity date may be any time on or after the individual's anticipated retirement at or near a date which is determined to maximize the retirement assets of the individual which may vary depending on the individual's overall asset portfolio, including available assets based on pooling arrangements. In some embodiments, the income payments commence at or near the individual's life expectancy, or a pre-determined number of years after the anticipated retirement, such as 5 or 10 years after, or at a date which is sufficiently after the anticipated retirement date to effect a reduced premium for the longevity insurance contract. For example, assuming an issue age of 50 and a retirement age of 65, the maturity date may be any age or date on or after the individual reaches age 65. To reduce the premium, the maturity age is preferably an advanced age, such as the individual's life expectancy or the date that the annuitant reaches age 75, 80, 85, 90, 95, etc., or any age in between or thereafter. Similarly, the premium may be reduced with a maturity date that reflects a minimum waiting period that is, e.g., 10, 15, 20, 25, 30, 35, etc. years after issuance of the contract or the individual's anticipated retirement. In one embodiment, the policy owner has the flexibility to advance or defer the maturity date provided the revised maturity date is after the end of the minimum waiting period. In another embodiment, a target maturity date serves in lieu of a minimum waiting period, providing the policy owner with flexibility to choose, after policy issuance, an actual maturity date that is sooner or later than the target maturity date, and that would be a factor in determining an adjustment to income benefits previously determined using the target maturity date as a basis. In other embodiments, the mortality basis used to compute the premium or the income payments at issue will generally be guaranteed for the life of the contract. That is, the premium and income payments will not change as a result of changes to mortality variables, e.g., the individual's age, health condition, etc., or as a result of changes to the insurer's mortality outlook, after the contract issues. The contract variables may be computed individually for each application for longevity insurance, or may computed for a variety of circumstances and tabulated or stored in a database, such as a contract variable database, that may be accessed, e.g., by an insurance agent or an employee of the insurer, at a later date for determining the premium or income payment for a potential payor based on the information provided. The computed contract variables with or without the insured's accumulated assets may be shown graphically or in a tabular format, as shown in FIGS. 8-13.

As noted above, longevity insurance may be provided as a provision, such as a rider, to a first insurance product, such as to a fixed or variably annuity, deferred or otherwise. In this instance, the premium for the provision may be paid directly, e.g., via billing or checking account deductions, or indirectly, e.g., as an asset based charge on some or all of the value of the annuity, such as 0.30%, 0.35%, 0.40%, 0.45%, 0.50%, or some other percentage of the annuity assets or a portion of the annuity assets, e.g., a portion maintained in a separate account, or a premium-based charge on some or all of the premium paid into the deferred annuity, such as 0.75%, 0.85%, 1.00%, or some other percentage of the deferred annuity premium payment or a portion of the deferred annuity premium payment, e.g., a portion allocated to a separate account, assessed periodically. The percentage may vary based on the information obtained, e.g., personal information, longevity insurance variables and options, etc, as discussed herein. For example, a variable annuity that may be drawn upon for income or allowed to accumulate may be offered with a longevity insurance provision or rider that matures at age 80 and pays income for life for an additional 1.00% or any other percentage per year of the variable annuity premium payment above any Mortality & Expense (M&E) fee of, e.g., 1.5% per year of the variable annuity assets or the variable annuity premium payment. A similar example is, a variable annuity that may be drawn upon for income may be offered with a longevity insurance provision or rider that matures at age 75 for an additional percentage of the variable annuity assets or premium payment per year that is higher, since the charges for the longevity insurance would be collected for a shorter period of time. Alternatively, the percentage charge for the longevity insurance may be the same for both of these cases, with the amount of the longevity insurance benefit being greater for the policy with the later maturity of the longevity provision (reflecting the fact that such policy had the longevity charges deducted for a longer period of time). The premiums may be flexible. That is, the insured may be given an option to change how the premium is paid initially, with or without the option to later change the manner in which the premiums are paid. In one embodiment, the mortality basis for a flexible premium contract may not be guaranteed, or alternatively, the mortality basis is guaranteed but additional premium amounts paid may be limited to a maximum percentage increase relative to the initial premium or a series of premiums paid over a specified time horizon.

The asset-based or deferred annuity premium-based fee will generally be applied for the duration of the first insurance product or up to the predetermined maturity date applicable to the longevity insurance provision, as the case may be, or for a shorter period of time. For example, an annuity that allows withdrawals may charge the asset-based or deferred annuity premium-based fee beginning after issuance of the variable annuity and ending at the predetermined maturity date of the longevity insurance provision if the individual outlives the predetermined maturity date. Thus, the asset-based or deferred annuity premium-based fee will be charged against the annuity for the duration of the annuity, including any accumulation period for a variable annuity. In another embodiment, the asset-based fee will be charged no for the duration of the annuity, but until the pre-determined maturity date of the longevity insurance provision.

In one embodiment, the combination of the first insurance product and the longevity insurance provision, e.g., rider, is treated as two insurance products, such as a traditional deferred annuity for accumulation, and longevity insurance, for a premium that is charged at a rate based on the assets of the first insurance product or a portion thereof or based on the premium payment that was paid for the first insurance product or a portion thereof. In this way, an annuitant may derive greater income from an annuity by limiting the term of withdrawals taken from the annuity or from other pools of assets to the predetermined maturity date of the longevity insurance. Any uncertainty with regard to whether or not the annuitant will outlive the predetermined date is covered by longevity insurance that is, in many instances, less costly. For example, an individual age 50 at issue may purchase a deferred annuity, which provides income to the individual (e.g., via withdrawals) between ages 65 and 85, along with a longevity rider, which provides income payments commencing on or about age 85 for life. The combination may therefore be a used as personal pension product which may provide greater income during retirement than other retirement funding options. The terms of the products may also be flexible. That is, the income may start at any age after, for example, age 60. If the income starts at less than the maximum age for tax-qualified plans as determined by the Internal Revenue Code, the pension may be able to be funded with money that originated in a tax-qualified plan.

Guaranteed minimum income benefit riders (GMIB), which are offered with many variable annuities, guarantee income payments based on the purchase price of the variable annuity or the purchase price grown at a fixed rate or reset periodically based on the policy's growth, which is applied to income factors that are discounted with an age set back or some other means, instead of being based on the cash value of the annuity applied to standard income factors. They purport to provide some degree of guarantee in the instance the cash value is much less than the GMIB rider notional amount. For example, assuming a variable annuity with a GMIB that was purchased with $100,000 has a cash value of $50,000 at the time income payments are to begin, the annuitant may annuitize the GMIB rider notional amount (assuming 5% per year accumulation) of $163,000 using the GMIB rider annuitization or income tables instead of the cash value using standard annuitization tables. The GMIB rider tables, however, typically apply an age set back or some other means of depressing the payments, which results in income payments that may be less than income payments computed using lower values applied to standard income tables. For example, annuitizing $163,000 using GMIB rider tables for life may be equivalent to annuitizing $110,000 using standard income tables. In this respect, the amount of income derived from variable annuities with GMIB riders may be less than expected. Furthermore, in order to receive the income payments guaranteed under the GMIB rider, clients must forfeit the value of the annuity.

Unlike annuities with GMIB riders, an insurance product with longevity insurance may allow the holder to keep the cash value of the variable annuity and any remaining accumulation value may be accessed by the insured or, after the insured's death, may be transferred to the insured's heirs. With regard to the above example, assuming instead a cash value of $120,000, the annuitant that purchases a variable annuity with the longevity insurance with income payments of $1,000 per month commencing at the predetermined maturity date may use the $120,000 cash value for a shorter period of time rather than for life thereby providing greater income than would be derived from an annuity with the GMIB rider. Additionally, the income provided with the longevity insurance rider would be certain at $1,000 per month at the time the annuity issues.

In one embodiment, pricing is derived at least in part based on an income purchased (Income Purchased$_t$) algorithm provided in Appendix A. The income purchased is generally proportional to the net premium ($NP_t$) to be paid into the contract and the crediting rate (i), and inversely proportional to the annuity factor ($_n|a_x'$) for the longevity insurance payable beginning at the maturity date of the longevity insurance. The annuity factor is based on mortality data for the individual taking into account, e.g., the probability that the individual will reach the longevity insurance maturity date or the individual's age at which income payments become payable, the individual's age at issue, etc. The annuity factor may also take into account any cost of living increases, as well as any other longevity insurance variable or option, such as the individual's gender, premium payment options, the duration that premium payments are to be made, etc. In one embodiment, longevity insurance is provided with a guaranteed minimum crediting rate. In this instance, each premium payment receives the greater of a minimum contractual rate and the then current rate with respect to computing the income purchased for the premium.

Once a premium, regardless of the, is computed, the longevity insurance contract may be offered to the individual at step 112, provided the eligibility requirements have been satisfied. Similarly, if the longevity insurance product is provided as a provision, whether as a rider or otherwise, to a first insurance product, the first insurance product may also be offered to the individual at the computed premium or income payment at step 112. If at step 114 the individual does not accept the offer to purchase the contract(s), the information obtained may either be saved, such as on the computer system described below, for future reference or discarded, and one or more of the steps described above can be repeated for the next potential purchaser. If the offer is accepted at step 114, the longevity contract may issue at the computed or determined premium along with or without the first insurance product at step 116. The steps required to issue a contract vary depending on the relationship between the individual that obtained the information and the insurer. For example, where the insurer or a party authorized to act on behalf of the insurer obtained the information, the contract may issue automatically or at some predetermined time thereafter, e.g., 30 days, etc. It however, the individual is an insurance agent with limited authority to bind the insurer, the contract may issue only after first being reviewed and accepted by the insurer. In any event, if the contract issues, the information obtained, such as the personal information, longevity insurance variables, etc., and any other relevant information are stored at step 118 in an appropriate database, such as a longevity insurance database.

In one embodiment, a two-tiered longevity insurance product is provided that allows potential insureds to choose two or more different income levels corresponding to two or more distinct phases of retirement. Such flexibility will meet the demands of consumers that might otherwise find a traditional single premium immediate annuity's income stream too limiting. For instance, consumers may wish to seek greater income while they are actively managing their remaining investment portfolio during their early retirement years, and then "step down" their income in their later years, in lockstep with a decreased level of overall investment activity. Others, by contrast, might wish to accept smaller guaranteed income payments in their early retirement years, while they draw income as needed from other sources, and then have their guaranteed income "step up" in their later years, when they are less able to manage their investment portfolio and expect to be more dependent on guaranteed income payments. Consumers may also wish to match their future income payments to the timing of their expected income needs based on their expected lifestyle. For example, consumers anticipating that they will be more active during their first twenty years of retirement might elect a higher level of payment for those years, and then "step down" their income level in their later, less active retirement years. By contrast, consumers anticipating greater income needs during their later retirement years may elect to have their income "step-up" after several years. The step-up percentage may be any percentage, preferably between about 1% and about 400%. The step-down percentage may similarly be any percentage, preferably between about 1% and about 50%.

Figure 2A:
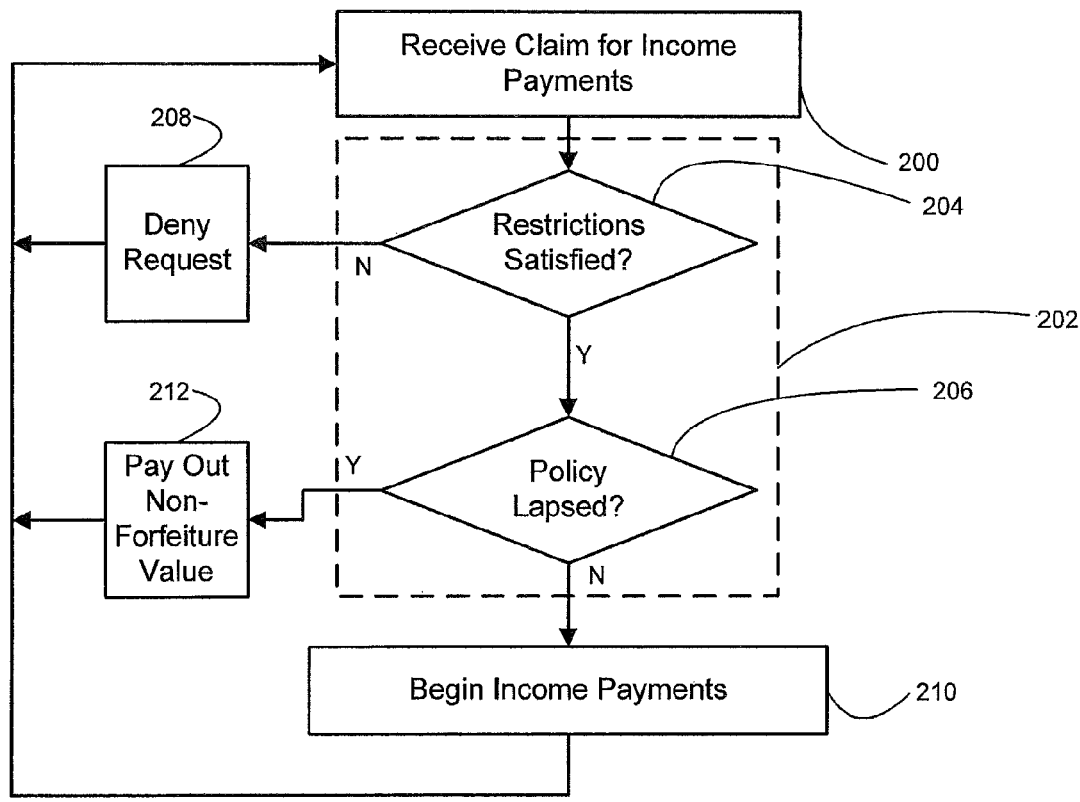
FIG. 2a is a flowchart of a method of administering longevity insurance according to one embodiment of this invention.

Referring to FIG. 2a, a method of administering longevity insurance as a standalone product, in one embodiment, begins with determining at step 200 that income payments should begin. The claim is generally a request or demand, which is designed to give notice to the insurer regarding an event that triggers income payments, which is generally the maturity date of the contract. The claim may be received from the annuitant in a variety of ways, including a hard copy claim or an electronic version thereof. The claim will then be tested at 202 with the limitations set forth in the longevity insurance contract for which the claim is being exercised, and any corresponding information related thereto. Testing the claim 202 generally denotes determining whether or not to begin income payments in accordance with the longevity insurance contract.

In one embodiment, testing includes determining at 204 whether or not one or more conditions, restrictions, or limitations that do not cause the contract to lapse have been satisfied, such as determining whether the contract has matured, e.g., whether the individual has outlived the predetermined date when income payments are to begin, etc. In another embodiment, testing includes determining at 206 whether the contract is in effect or has otherwise lapsed. This may occur, for instance, if scheduled premium payments, whether or not asset-based, were discontinued during the premium payment period.

If at step 204 the demand fails with regard to the conditions, limitations, or restrictions set forth in the longevity insurance contract, the claim will be denied at step 208 and the above steps may be repeated for the next or subsequent claims. If at step 206 it is determined that the longevity insurance contract has lapsed, a non-forfeiture payout (e.g., based on an applicable non-forfeiture law), or other specified surrender value, may be made or commence at step 212. For example, lower income payments may be made to individuals whose policies lapsed during the premium payment period or who have paid less than the full premium for longevity insurance. If the claim passes the testing criteria, income payments may begin being distributed at step 210.

Figure 2B:
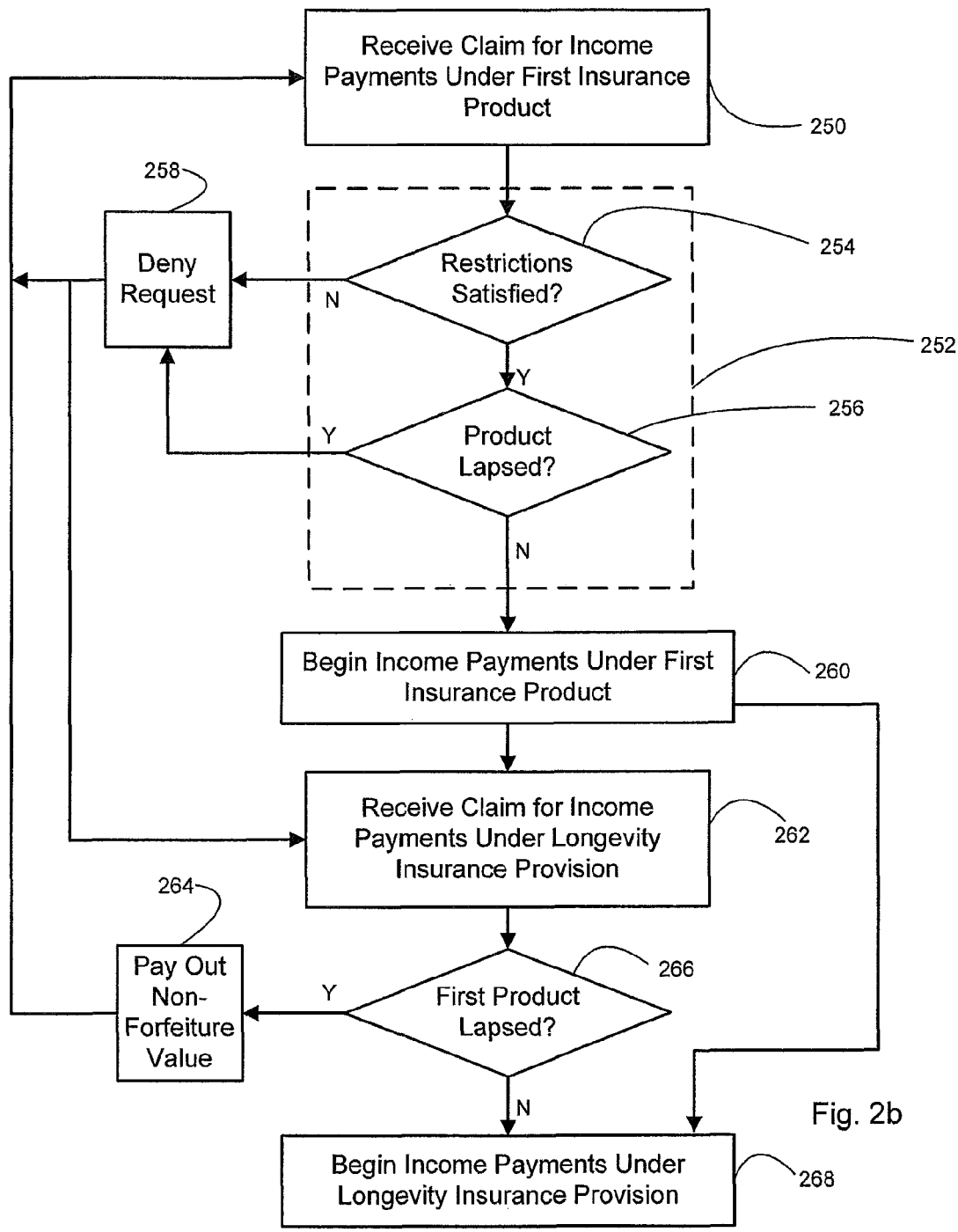
FIG. 2b is a flowchart of a method of administering a longevity insurance provision according to one embodiment of this invention.

Referring to FIG. 2b, a method of administering longevity insurance as a provision or rider to a first insurance product, in one embodiment, begins with determining at step 250 that income payments under the first insurance product should begin. As stated above, this determination could follow a variety of events, such as a maturity date being reached or a claim being received from an insured. If a claim is received, the claim is tested at 252 with the limitations set forth in the first insurance product to determine whether or not to begin income payments under the rider to the first insurance product. In one embodiment, testing includes determining at step 254 whether or not one or more conditions, restrictions, or limitations that do not cause the contract to lapse have been satisfied. For example, if the first insurance product is a deferred annuity, a determination may be made as to whether the individual has achieved the age when income payments under the longevity insurance rider are to begin, which is likely to be some age on or after 75. Similarly, if the first insurance product is an immediate annuity, a determination may be made as to whether the premium has been paid. In another embodiment, testing includes determining at step 256 whether the first insurance product is in effect or has otherwise lapsed, which may occur if premium payments for the first insurance product were discontinued during the premium payment period or if the first insurance product was surrendered for its accumulation value.

If at steps 254 or 256 the demand fails, the claim for income payments under the longevity insurance rider to the first insurance product will be denied at step 258 and the above steps may be repeated for the next or subsequent claims, otherwise income payments may commence under the first insurance product at step 260. As noted above, the rider may be treated as a separate product and may thus entitle the holder to rights there under whether or not the first insurance product lapsed. Thus, even though a claim for income from the first insurance product was denied at step 258, a claim for income under the longevity insurance provision may be made at step 262 and a determination may be made as to whether the first insurance product lapsed at step 266. If it is determined that the first insurance product has lapsed, a non-forfeiture payout may be made or commence at step 264 corresponding to the premium paid, e.g., in the form of asset-based fees and/or scheduled or unscheduled premium payments as discussed above, if the longevity insurance provision has matured. Otherwise, if the first insurance product did not lapse, income payments may begin being distributed at step 210 also providing that the longevity insurance provision has matured. Where the first insurance product has not lapsed, the income payments under the longevity insurance provision may commence at the maturity date of the longevity insurance provision with or without such a claim for income payments.

Figure 2C:
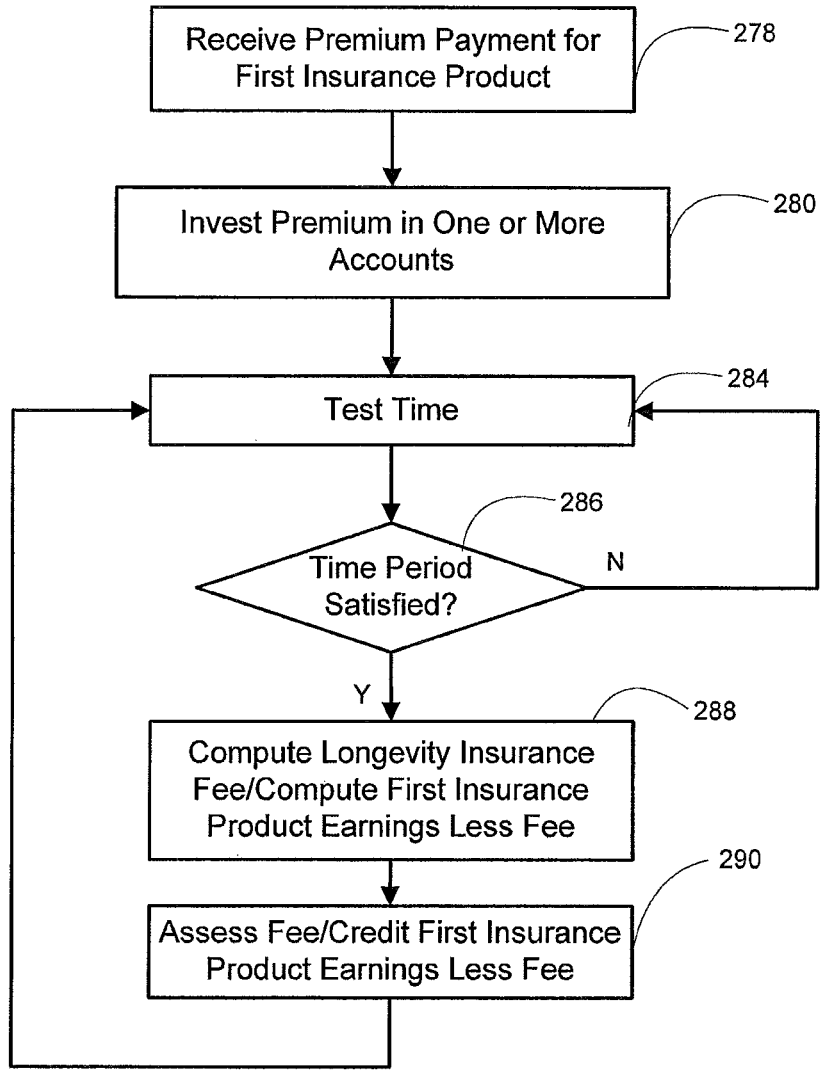
FIG. 2c is a flowchart of a method of administering a longevity insurance provision according to another embodiment of this invention.

Referring to FIG. 2c, upon issuance of the first insurance product with the longevity insurance provision, the longevity insurance provision may further be administered by periodically assessing a fee based on the value of the assets of the first insurance product. In this instance, the premium paid for the first insurance product is received at step 278 and invested or otherwise tracked in one or more accounts, e.g., a fixed account, an investment account, or a combination thereof, at 280. At least initially, the premium payment(s) will comprise the majority of the first insurance product assets. Thereafter, the first insurance product assets reflect any appreciation, depreciation, and additional premium payments, if any, tracked in one or more accounts. Funds deposited into the fixed account generally appreciate at a known rate, e.g., a fixed rate or a variable rate based on an indicator, such as the prime interest rate, whereas the separate account tracks particular investments made with funds deposited therein. A fixed account may be used to track assets under a fixed annuity, and a combination of a fixed account and a separate account may be used to track uninvested and invested assets, respectively, under a variable annuity. Similarly, uninvested and invested assets may be tracked separately in the same account.

The asset-based longevity insurance premium or fee will generally be assessed periodically, such as annually, semiannually, quarterly, etc., against or based on the assets of the first insurance product at the time the fee is being assessed. In one embodiment, the asset-based longevity insurance fee will be assessed against the assets of the first insurance product periodically based on the issue date of the first insurance product, such as on the anniversary of the first insurance product. In this instance, the time from the issuance of the first insurance product, e.g., the variable annuity, may be tested to determine if the asset based fee, as well as any other fee, such as the Mortality and Expense fee for a variable annuity, should be assessed against the assets of the first insurance product at step 284. If at step 286 the period for assessing the fee is satisfied, the fee may be assessed accordingly, otherwise, the system will test the time period at a later date.

The manner in which the fee is assessed will vary according to the type of fee. For instance, where the fee is assessed as a percentage of the first insurance product assets, a determination may first be made regarding the value of the first insurance product assets or an applicable portion thereof and the fee may then be computed as a percentage of the value of the assets at step 288. Where the fee is assessed based on the difference between a guaranteed minimum interest rate and the actual interest or other earnings earned from or based on the first insurance product assets, a determination may similarly be made regarding the value of the first insurance product assets or a portion thereof, and the earnings based on a guaranteed interest rate may then be computed. Once determined, the fee or the earnings may be applied to the first insurance product assets at the computed values.

Figure 3:
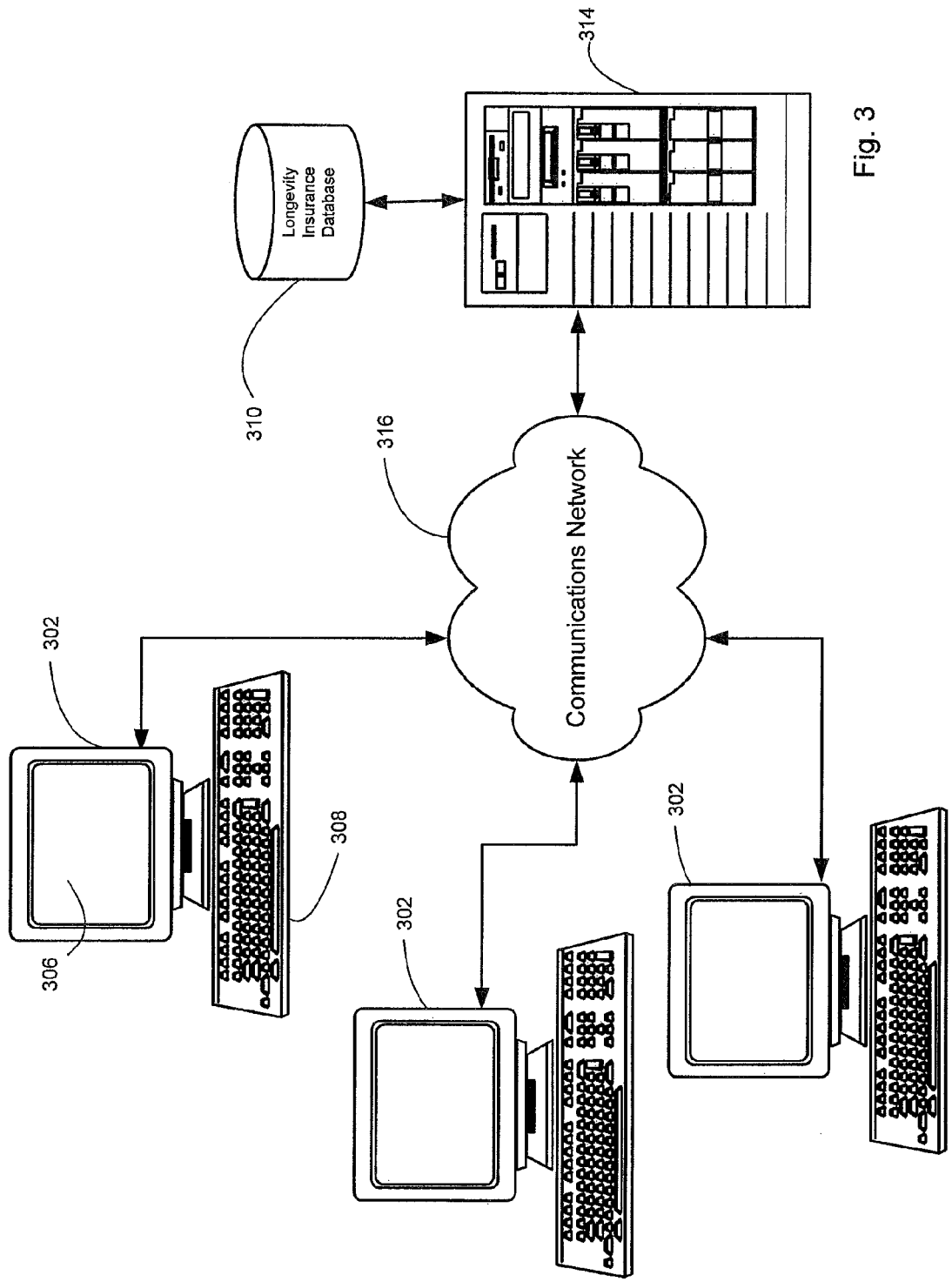
FIG. 3 is a diagram of a system useful for providing longevity insurance according to one embodiment of this invention.

Referring to FIG. 3, a system useful in providing longevity insurance according to one embodiment of this invention includes a client interface 302 having a processor and associated computer memory, a display device 306, and an input device 308. The client interface 302 is at least one of a programmable calculator, or a personal computer or special purpose computer having appropriate software or otherwise designed to compute or assist in determining the longevity insurance premium or an income payment according to the methods described herein. The software may be installed locally at the client interface 302, thereby enabling a user to input information obtained regarding the insurance contract, and to determine a premium for the insurance contract given a selected or specified income payment, or to determine an income payment given a selected or specified premium. The software may be proprietary software designed to provide the methods described herein or, alternatively, commonly available software, such as spreadsheet or a database programs, adopted to perform the same. Longevity insurance may be sold in distribution channels (e.g., insurance agents, broker-dealers, direct mail, and the Internet) by any properly licensed individuals who may leverage sales tools (e.g., software and paper-based tools), techniques (e.g., advertisements and seminars), or a combination thereof. The system as described herein maybe therefore be made accessible to various users, including brokers, agents, employees of the insurer, potential insureds, potential payors, etc.

In an alternative embodiment, the client interface 302 is communicatively connected to at least one server 314 over a communications network 316, such as a local area network (LAN), a wide area network (WAN), the Internet, the World Wide Web (WWW), a wireless network, or a combination thereof. The server 314 includes at least one database, such as a longevity insurance database 310. The longevity insurance database 310 generally includes information obtained from individuals that is useful for issuing the longevity insurance contract, such as personal information, longevity insurance variables, longevity insurance options, etc.

In one embodiment, the client interface 302 accesses the relevant database or databases, stored locally at the client interface 302 or remotely at the server 314, for information necessary to compute or otherwise determining the premium or the income payment for the longevity insurance contract, and may update the relevant databases accordingly. Similarly, the client interface 302 accesses the longevity insurance contract database to test a claim for income payments.

In one aspect of the invention, a retirement planning tool is provided for computing one or more of the variables discussed herein. The retirement planning tool may be implemented with software, hardware, or a combination thereof to generally receive the requisite information with one or more interface screens and display or otherwise causes to be displayed one or more graphical user interface screens that include the computed premium, income payments, anticipated cash flows, etc., either in a graphical or textual form. The retirement planning tool may be installed locally at a client interface as described above, or in an alternative embodiment, the client interface is communicatively connected to at least one server over a communications network as described above.

In one embodiment of the present invention, a retirement planning tool is provided to perform methods of retirement asset and income allocation assessments, demonstrations and recommendations. In one aspect a comprehensive view of the consumer's overall investment portfolio is created that reflects retirement income and investment assets as applicable, as well all other asset classes (e.g., stocks, bonds, and mutual funds), if any. In some embodiments, the retirement income analysis tool provides a hypothetical modeling of an individual's assets according to an enhanced database of historical rates of return for both equities and fixed income securities. In another aspect the risk of an individual's outliving his or her assets is demonstrated along with the ability of guaranteed lifetime income products to address the identified risk(s). In still another aspect recommendations are provided concerning an individual's asset combination and configuration to facilitate more adequate retirement income by incorporating some degree of guaranteed lifetime income. In some embodiments, individuals are able to prioritize asset withdrawal to determine in advance the order of the withdrawals to be taken from their various assets within the long-term withdrawal process.

Referring to FIG. 4, in one embodiment, the retirement planning tool displays a profile interface screen that includes at least one form element therein for receiving or otherwise obtaining information relevant to issuing longevity insurance, a first insurance product, or any other type of insurance product, such as the first and/or last name of the potential insured, the date of birth, marital status, and address. The information may be used further to generate a customized presentation for the potential insured.

Referring to FIG. 5, in one embodiment, the retirement planning tool displays a retirement income needs interface screen that includes at least one form element therein for collecting information about the client's, e.g., the potential insured's, expenses, such as healthcare expenses and any other basic expenses or discretionary expenses. The expenses may be actual recurring expenses or anticipated expenses the potential insured expects to incur at a later date, e.g., after retirement. The user may also provide an estimated annual inflation rate for each of these types of expenses. This information is generally collected in today's dollars, and may be used to calculate and display the potential insured's anticipated cash flows during retirement. At least one number for healthcare expenses, other basic expenses, or discretionary expenses is preferably required information for computing and displaying anticipated retirement cash flow.

Figure 6:
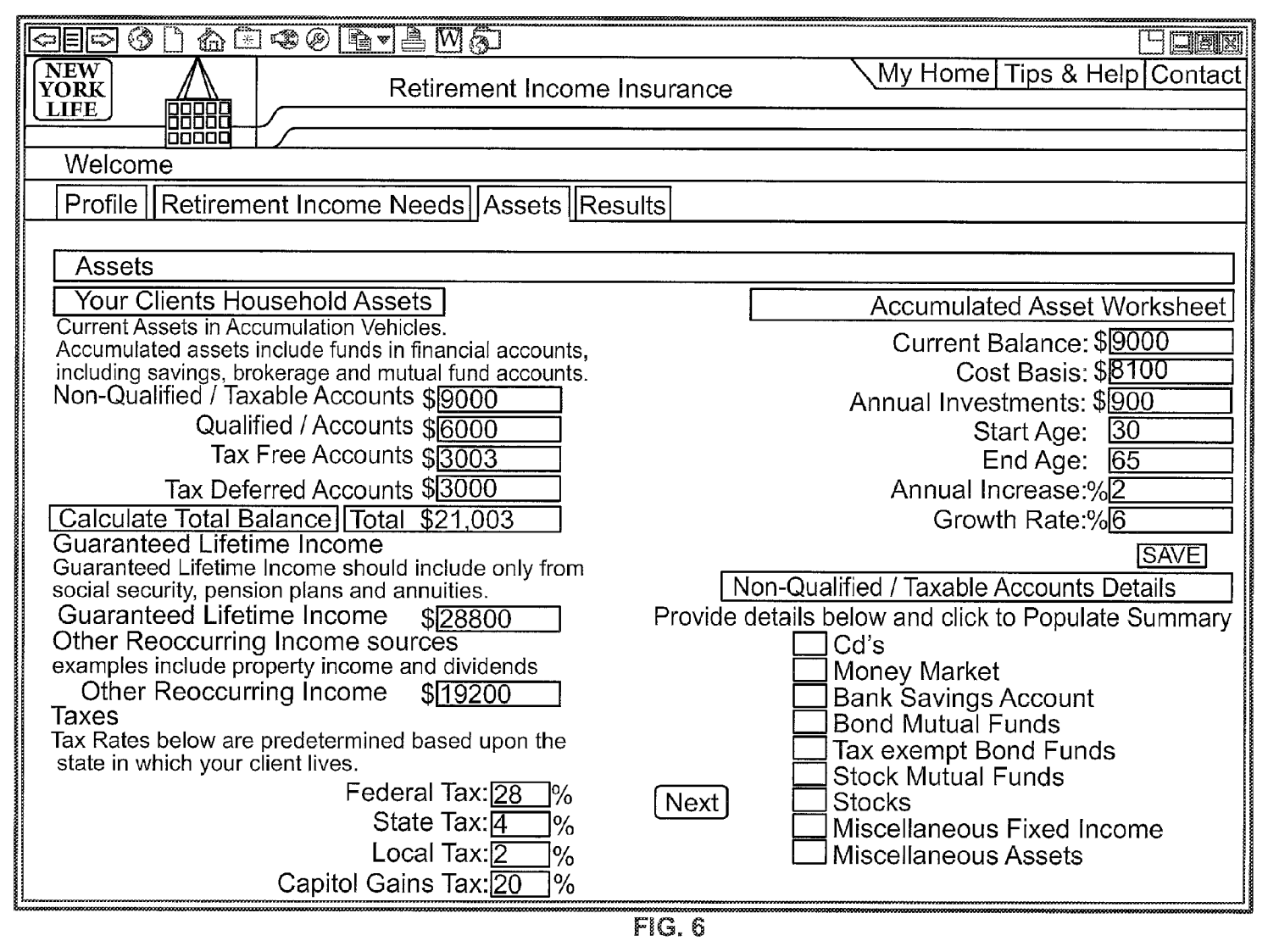

Referring to FIGS. 6-7, in one embodiment, the retirement planning tool displays an assets interface screen that includes at least one form element for collecting information about a potential insured's current assets, anticipated retirement income, or tax rates, or a combination thereof. The interface screen may also include form elements for specifying information about future investment plans and anticipated deterministic growth rates for each asset. This information may be used to project future asset accumulation, and to estimate the total assets the insured has for retirement. One or more of the following may be required for at least one asset type: current balance, cost basis, annual investment, start month/year (for annual investments), end month/year, annual increase (in annual investments), and growth rate for at least one asset class. One or more of the following may also be required for at least one income type: monthly payment amount, taxable portion, annual increase, start month/year, and end month/year.

Figure 8:
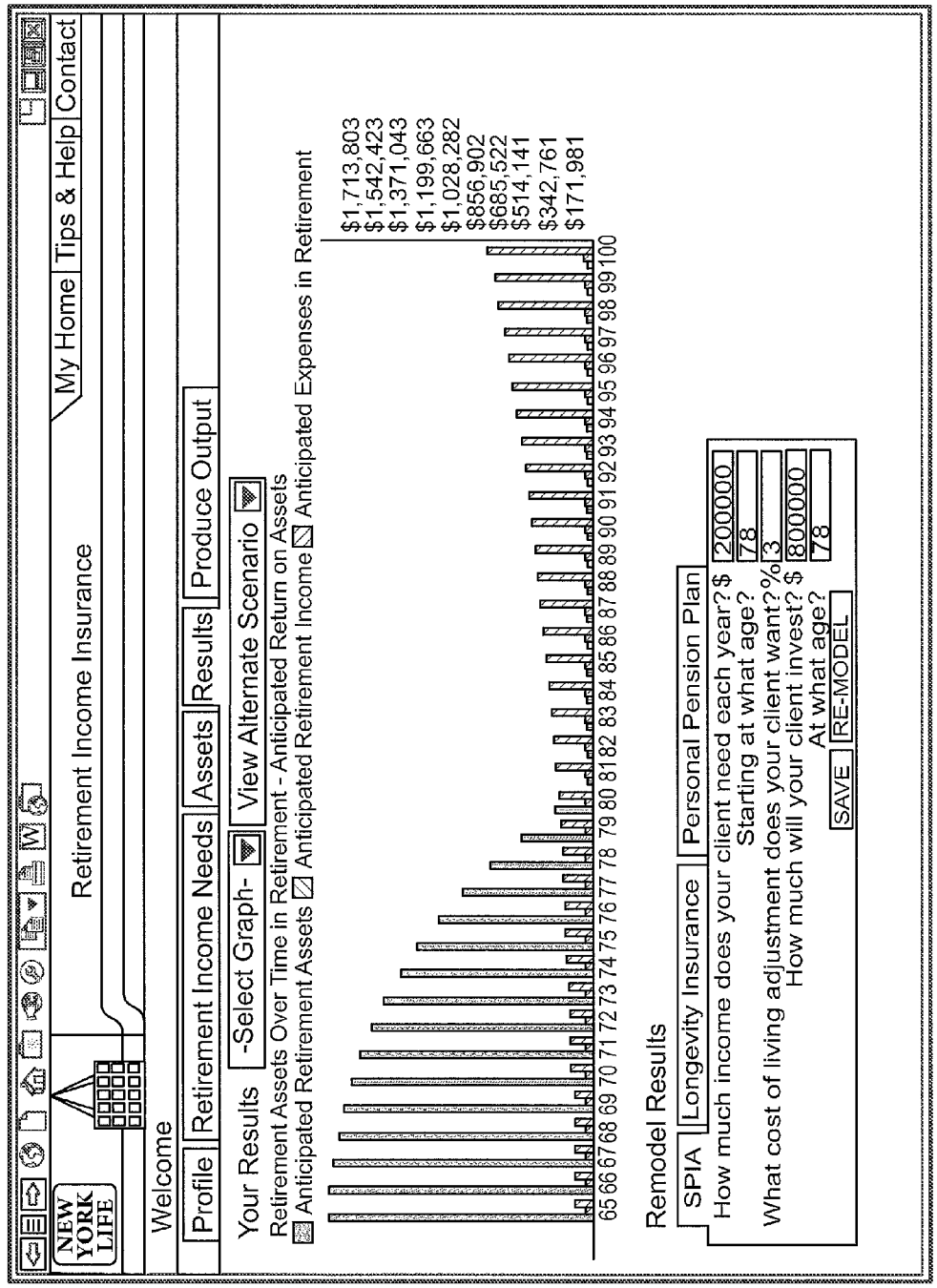

Referring to FIG. 8, in one embodiment, the retirement planning tool displays an interface screen that shows an insured's anticipated cash flow in retirement based on the information provide with one or more of the interface screens shown in FIGS. 4-7. The anticipated cash flow is generally based on the total assets that will or are expected to be accumulated for retirement according to deterministic growth rates input on the assets page, as well as anticipated income, and inflation-adjusted expenses, if any. By showing how an insured's assets are drawn down in retirement until the insured runs out of money, this interface screen enables users, such as insurance agents and other sales professionals, to illustrate how the income from retirement income insurance products can help clients meet their retirement income needs. The chart provided by the interface screen is preferably based on one or more of the following: annual income needed, tax-free amount for year 1, cost-of-living adjustment amount, start month/year for income, premium amount, e.g., for longevity insurance, start month/year for premium, and end month/year for premium. The interface screen may also include a drop-down menu that enables the user to see how different scenarios impact the insured's portfolios. For example, agents can choose to see a scenario where the client experiences returns that are 10% more or less favorable than the deterministic growth rates input on the assets page; or the insured can see how his or her portfolio would have performed if those designated as "equities" had grown according to S&P 500 returns and those designated as "fixed income" had grown according to the performance of U.S. Treasury bond returns.

Figure 9:
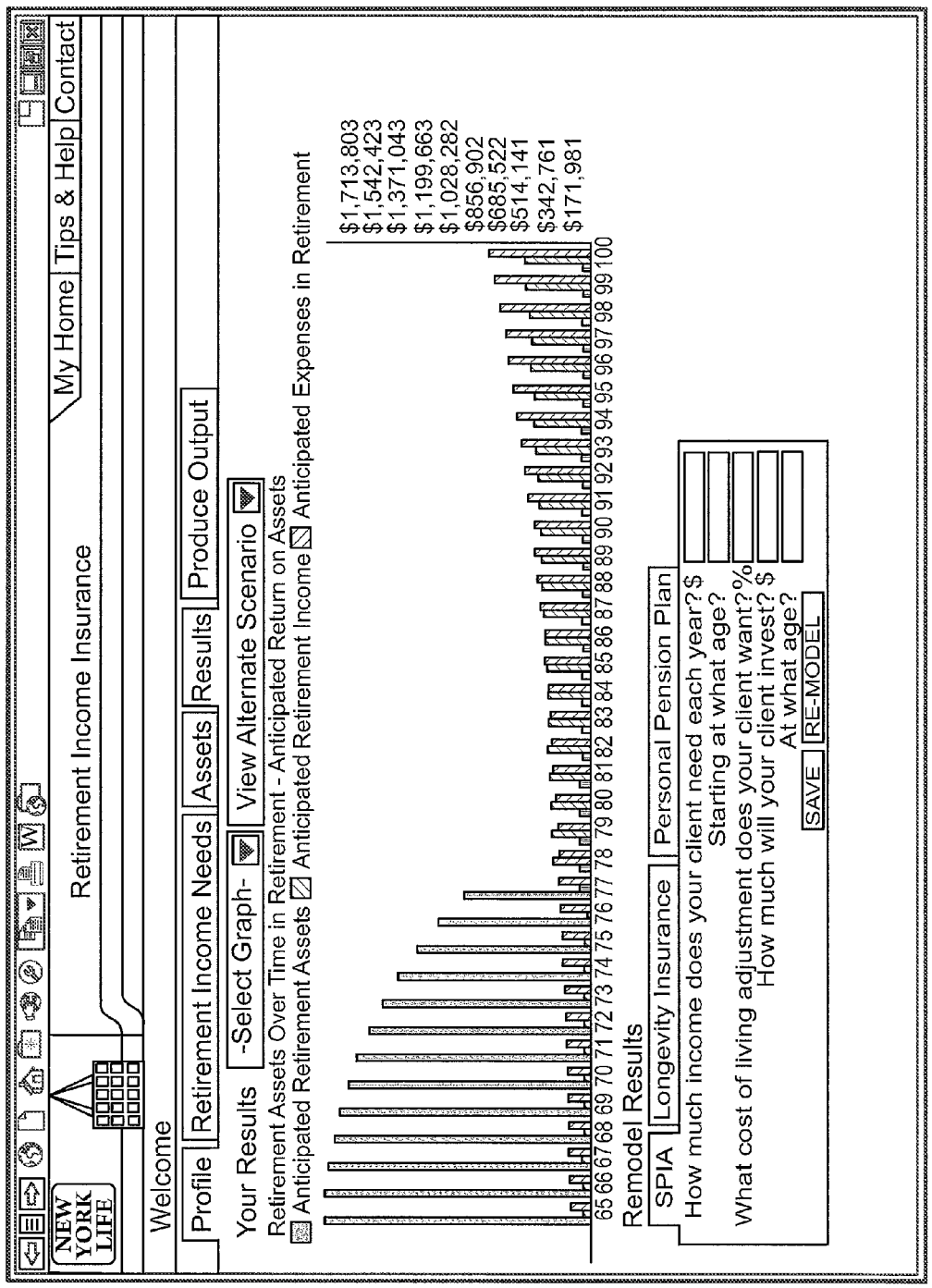
Figure 10:
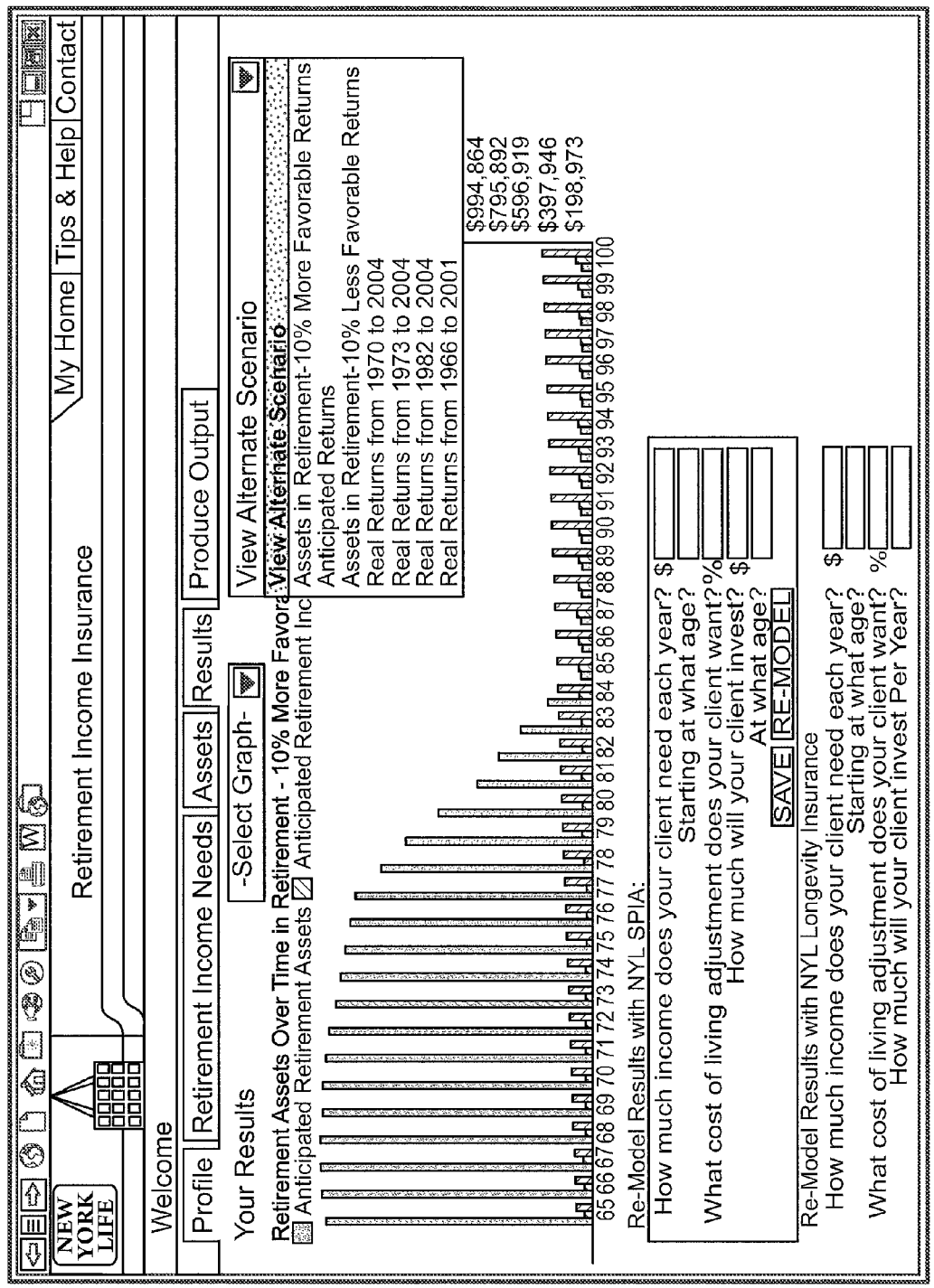
Figure 11:
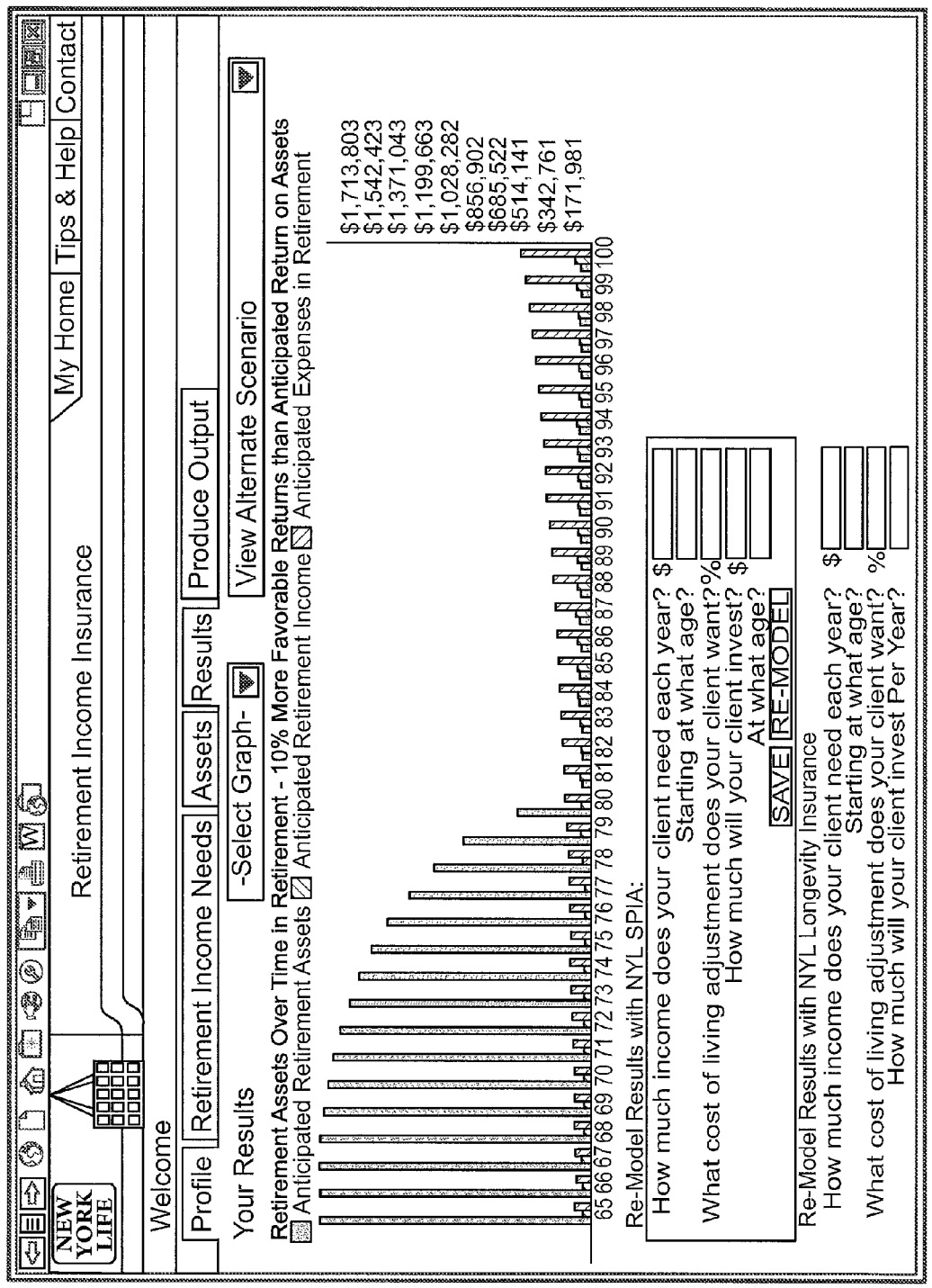
Figure 12:
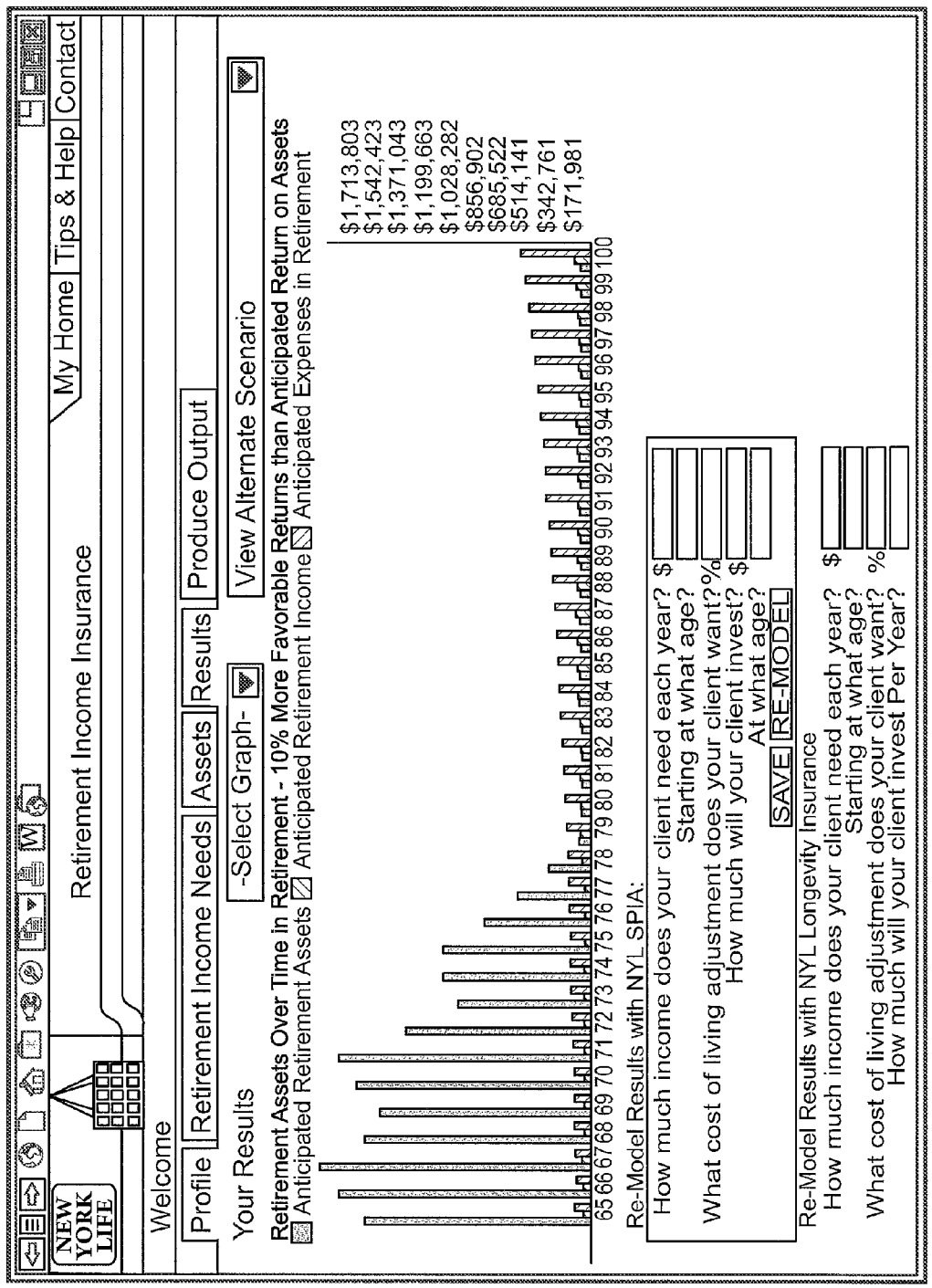

Referring to FIG. 9, in one embodiment, the retirement planning tool preferably displays an interface screen that shows anticipated returns page adjusted to include the purchase of longevity insurance as described herein, as well as other products, including a single premium immediate annuity. One can observe that assets have been reduced based on the cost of the products and the annual income from the assets has been increased according to the anticipated product benefits. Referring to FIGS. 10 and 11, the assets over time in retirement interface screen may also show anticipated cash flow in a scenario where the client experiences returns that are 10% more or less favorable than the deterministic growth rates input on the assets page. Referring to FIG. 12, the assets over time in retirement interface screen may also show anticipated cash flow based on historic returns from 1966 to 2001 or any other year or years of an index, such as the S&P 500. Referring to FIG. 13, each of the results pages may also be displayed in a tabular format. The tabular format preferably shows year-by-year values for: assets, healthcare expenses, other basic expenses, discretionary expenses, insurance product premiums, total expenses, guaranteed retirement income, other recurring income, insurance product income, and total income. The retirement planning tool also may show asset withdrawal prioritization, which allows clients to determine ex ante the order of the withdrawals to be taken from their various assets within the long-term withdrawal process.

The retirement tool may display a presentation interface screen that allows users, such as agents, to produce a personalized retirement planning presentation for his or her client. This presentation can include a summary of the data that was input into the retirement planning tool, as well as the graphs and tabular output that was produced based on that data. Further, the agent can customize the presentation by choosing which graphs, charts, and concepts to include for a particular client on a particular day.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Appendix A

Formulas for Longevity Insurance

Formulas $$NP_t = GP_t \times (1 - PremTax) - \text{Policy Fee};$$

$$v_t = (1 + i)^{-(t/12)};$$

$$j_t = 0 \quad \text{if } t < m$$
$$= \text{truncation}\left(\frac{t - m}{12}\right) \quad \text{if } t \geq m;$$

$$p'_x = 1 - \frac{1 - (1 - q_x)^{\frac{1}{12}}}{(1 - q_x)^{\frac{1}{12}}};$$

$$_n p'_x = \prod_{s=0}^{n-1} p'_{x + \frac{s}{12}};$$

$$_n | a'_x = \sum_{s=n}^{\infty} (v_s) \times (_s p'_x) \times (1 + COLA)^{js};$$

$$IncomePurchased_t = \frac{NP_t}{(1 + i)^{\frac{-d}{365}} \times \left(_{(m-t)}| a'_{x + \frac{t}{12}}\right)};$$

and $$IncomePaid_t = \left(\sum_{s=0}^{m-1} IncomePurchased_s\right) \times (1 + COLA)^{j_t} \quad \text{if } t \geq m$$
$$= 0 \quad \text{if } t < m$$

where,

Issue Date=Date when initial premium is received;
Maturity Age=Age when income benefits will commence. The maturity age is chosen at issue and cannot be changed;

Income Start Date=Date of the first income payment, which is the annuitant's birthday in the year he/she attains the Maturity Age;
x=Issue age of annuitant;
t=Number of complete months since Issue Date;
m=Number of complete months between Issue Date and Income Start Date;
$j_t$=Number of complete years between time t and Income Start Date;
$GP_t$=Gross Premium paid into contract at time t;
$NP_t$=Net Premium paid into contract at time t;
COLA=annual % increase in benefit elected on Issue Date;
PremTax=State premium tax (varies by state);
$IncomePurchased_t$=Amount of monthly income purchased by the premium deposited at time t;
$IncomePaid_t$=Amount of monthly income due at time t;
Calc_Date=Calculation Date for Income to begin=m months after Issue Date;
d=Number of days between the Calc_Date and the Income Start Date;
i=annual crediting rate;
$v_t$=Present Value of a dollar paid in month t based on a discount rate of i;
$q_x$=Annual mortality rate for a person age x;
$p_x'$=Monthly survival rate for a person age;
$_n p_x'$=Probability that a person age x survives n months; and
$_n | a_x'$=annuity factor for an n-month deferred no refund life annuity payable to a person age x;

What is claimed is:

1. A computerized method for providing longevity insurance comprising:
electronically receiving information for issuing a first insurance product and longevity insurance in the form of a provision of the first insurance product for an individual, the longevity insurance provision providing deferred income payments for a period of time in a second stage of retirement beginning at a predetermined date that is after an individual's anticipated retirement date, the first insurance product providing income payments for a period of time in a first stage of retirement up to the predetermined date; and
electronically determining, via a processing device, one of a premium and an income payment for the individual for the longevity insurance provision, the premium or income payment computed at least in part based on: an amount of income purchased, wherein the amount of income purchased is a function of a net premium paid into contract at an income start date under the longevity insurance provision, an annual crediting rate, an amount of time between the issue date and the income start date of the longevity insurance provision, and an annuity factor.

2. The method of claim 1, wherein the predetermined date is based on the individual's life expectancy.

3. The method of claim 2, wherein the premium is computed based at least in part on a probability of the individual outliving his or her life expectancy.

4. The method of claim 1, wherein the longevity insurance provision is limited to individuals having a maximum age at issuance of the first insurance product and wherein the maximum age is a fixed number of years prior to the individual's anticipated retirement date and the predetermined date is a fixed number of years after the individual's anticipated retirement date, the premium or the income payment for the longevity insurance provision computed further based at least in part on a time between the individual's age at the issuance of the first insurance product and at the predetermined date to which the income payments are deferred.

5. The method of claim 1, wherein the predetermined date is a date at which the individual shall have accrued sufficient mortality credits in a pooling arrangement to fund entirely the income payments to the individual from the pooling arrangement.

6. The method of claim 1, wherein determining the premium for the individual comprises determining an asset-based premium assessed periodically against assets of the first insurance product.

7. The method of claim 1, wherein the premium or income payment is computed based at least in part on a probability of the individual outliving the predetermined date to which the income payments are deferred.

8. The method of claim 1, wherein the longevity insurance provision is an optional rider to the first insurance product.

9. The method of claim 1, wherein the information useful for issuing at least one of the first insurance product and the longevity insurance provision is obtained with a profile interface screen that comprises at least one form element for a user to specify the information.

10. The method of claim 1, comprising displaying a retirement income needs interface screen that comprises at least one form element for obtaining information regarding the individual's expenses.

11. The method of claim 10, wherein the information relating to expenses comprises at least one of a group consisting of: healthcare expense, a basic expense, and a discretionary expense.

12. The method of claim 1, comprising displaying an interface screen that comprises at least one form element for obtaining information regarding the individual's assets.

13. The method of claim 1, comprising displaying an interface screen that comprises at least one form element for specifying information regarding future investment plans.

14. The method of claim 1, comprising displaying an interface screen that comprises at least one form element for specifying information regarding anticipated growth rates for at least one asset class.

15. The method of claim 1, comprising projecting asset accumulation for retirement based on at least one a group consisting of: information regarding the individual's assets, information regarding future investment plans, and information regarding anticipated growth rates.

16. The method of claim 1, comprising computing an anticipated retirement cash flow for the individual and displaying an interface screen that comprises the computed cash flow.

17. The method of claim 16, wherein anticipated retirement cash flow accounts for at least one of a group consisting of: an annual income needed, a tax free amount for year 1, a COLA amount, a start date for income, a premium amount for the longevity contract, a start date for the premium, and an end date for premium.

* * * * *